(12) United States Patent
Stumpf et al.

(10) Patent No.: US 11,970,187 B2
(45) Date of Patent: Apr. 30, 2024

(54) VEHICULAR CABIN MONITORING AND RESPONSE

(71) Applicant: GM Cruise Holdings LLC, San Francisco, CA (US)

(72) Inventors: Katherine Mary Stumpf, San Francisco, CA (US); Andrew David Acosta, San Francisco, CA (US); Reed Townsend Jones, San Francisco, CA (US); Omid Farivar, San Bruno, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 436 days.

(21) Appl. No.: 16/842,149

(22) Filed: Apr. 7, 2020

(65) Prior Publication Data

US 2021/0309259 A1    Oct. 7, 2021

(51) Int. Cl.
| | |
|---|---|
| *B60W 60/00* | (2020.01) |
| *B60W 40/08* | (2012.01) |
| *G01C 21/34* | (2006.01) |
| *G06V 20/59* | (2022.01) |

(52) U.S. Cl.
CPC ........ *B60W 60/0024* (2020.02); *B60W 40/08* (2013.01); *B60W 60/00253* (2020.02); *G01C 21/3415* (2013.01); *G06V 20/59* (2022.01); *B60W 2540/21* (2020.02); *B60W 2556/45* (2020.02)

(58) Field of Classification Search
CPC ............. B60W 60/0024; B60W 40/08; B60W 60/00253; B60W 2540/21; B60W 2556/45; B60W 2050/0075; B60W 2540/01; B60W 2540/041; B60W 2540/043; B60W 2540/045; B60W 50/14; G01C 21/3415; G01C 21/3608; G01C 21/3617; G06V 20/59; G06V 40/20
USPC ......................................... 701/23; 455/404.1
See application file for complete search history.

(56) References Cited

U.S. PATENT DOCUMENTS

| | | | |
|---|---|---|---|
| 10,248,119 B2 * | 4/2019 | Kentley-Klay | ......... B60L 15/20 |
| 2017/0229125 A1 | 8/2017 | Jiang et al. | |
| 2018/0225551 A1 * | 8/2018 | Lin | .......... A61L 9/122 |
| 2018/0251122 A1 * | 9/2018 | Golston | ........... B60W 50/0098 |
| 2018/0267526 A1 * | 9/2018 | Makke | ................... B60R 16/037 |
| 2019/0318159 A1 * | 10/2019 | Blanc-Paques | ........ G06Q 50/30 |
| 2020/0010051 A1 * | 1/2020 | Dumov | ................ G06V 40/172 |
| 2020/0090681 A1 * | 3/2020 | Hu | ......................... A61B 5/4803 |
| 2020/0098201 A1 * | 3/2020 | Reibling | ............... B60W 30/09 |

(Continued)

FOREIGN PATENT DOCUMENTS

EP    2942012 A1 * 11/2015   ........... A61B 5/0205

*Primary Examiner* — Elaine Gort
*Assistant Examiner* — Ellis B. Ramirez
(74) *Attorney, Agent, or Firm* — Michael DiCato

(57) ABSTRACT

Embodiments may relate to a vehicle comprising: a sensor to identify, based on an audio or visual condition, the occurrence of a condition related to a passenger of the vehicle. The vehicle may further include a processor coupled with the sensor. The processor may be configured to identify, in a user profile of the first passenger of the vehicle, a pre-identified action. The processor may further be configured to perform, or facilitate the performance of, the pre-identified action by the vehicle based on the occurrence of the audio or visual condition. Other embodiments may be described or claimed.

20 Claims, 8 Drawing Sheets

(56) References Cited

U.S. PATENT DOCUMENTS

| | | | |
|---|---|---|---|
| 2021/0004929 A1* | 1/2021 | Sawahashi | G08G 1/202 |
| 2021/0068737 A1* | 3/2021 | Ghannam | B60W 60/001 |
| 2021/0105619 A1* | 4/2021 | Kashani | G10L 15/25 |
| 2021/0287017 A1* | 9/2021 | Turk | G06V 40/10 |
| 2022/0388661 A1* | 12/2022 | Balasubramanian | H04W 4/90 |

* cited by examiner

US 11,970,187 B2

VEHICULAR CABIN MONITORING AND RESPONSE

BACKGROUND

A passenger using a rideshare service may encounter a situation where a response from the vehicle may be desirable. Such a situation may be related to a status of the passenger such as anxiety or a health-related condition, or a situation related to another passenger such as a hostile driver or co-passenger.

DETAILED DESCRIPTION

Figure 1:
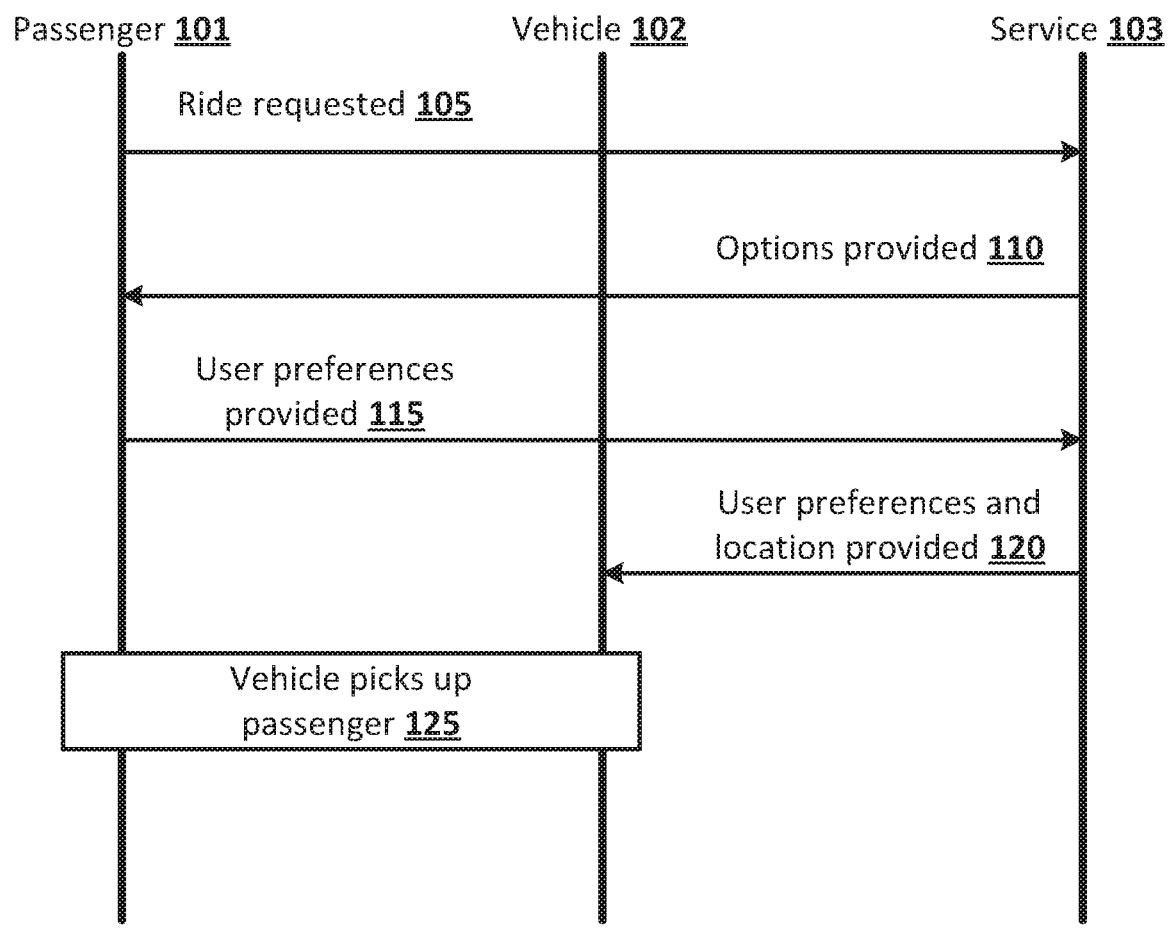
FIG. 1 depicts an example system overview between a passenger, a vehicle, and a rideshare service, in accordance with various embodiments.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Embodiments herein may be described within the context of an autonomous vehicle ("AV"), however it will be understood that embodiments may also be applicable to other vehicle situations such as a rideshare service where a driver of the vehicle is present. Additionally, in the AV, a driver may not be able to interact with navigational or speed controls of the vehicle, while in other embodiments the AV may include a driver that is able to interaction with the navigational or speed controls of the vehicle to some degree. The term "vehicle" may be used herein as a generalized term to describe various embodiments, and may be understood to refer to both an AV and a vehicle wherein a driver is present.

As used herein, the term "passenger" may refer to an occupant of the vehicle. For example, the term "passenger" may refer to a driver of the vehicle or a person riding in the vehicle. Additionally, the term "passenger" will be used herein as a general term for a user of the rideshare service, whether they have entered the vehicle or not. In other words, the term "passenger" may be applied to an individual that is requesting a ride through the rideshare service, but have not yet entered the vehicle. This term is used for continuity in identifying the individual throughout the entirety of the application. Additionally, as used herein, the term "cabin" may refer to a portion of a vehicle where one or more passengers may be located.

As previously noted, a passenger using a rideshare service may encounter a situation where a response from the vehicle may be desirable. Such a situation may be related to a status of the passenger such as anxiety or a health-related condition, or a situation related to another passenger such as a hostile driver or co-passenger. Such a situation may be exacerbated in situations where the vehicle of the rideshare service is an AV.

In legacy rideshare vehicles, if a situation does begin to escalate, the vehicle may not be equipped to record or transit information or perform any responsive actions. Additionally, attempts to intervene by a driver of the vehicle may be obvious to the co-passenger, and may escalate the situation. Because legacy vehicles may not be equipped to record or transmit information, understanding of the situation may rely on testimony of the parties present, and may be conflicting or may not be relayed in real-time.

Embodiments herein may relate to situations where real-time actions may be performed responsive to a situation in the vehicle cabin. Specifically, embodiments herein may allow a passenger of a rideshare service to opt into, and set up, various features which may be used to identify a situation in a cabin of a rideshare vehicle. Such features may include a verbal cue (e.g., a specific word or phrase that is uttered by the user), monitoring of volume or tone of voice in the cabin (e.g., to detect raised or hostile voices), video monitoring to identify whether a passenger is altering a movement pattern in the cabin (e.g., making large movements or ceasing to move), etc. The passenger may also be allowed to identify an action that is to be taken by the vehicle responsive to detection of the situation. Such an action may include alerting a pre-identified contact of the passenger, re-routing the vehicle, contacting an emergency service such as a medical or police service, etc. Generally, these features may be identified prior to the passenger before the passenger enters the vehicle (e.g., during setup of the user profile of the rideshare service, when requesting a ride from a vehicle of the rideshare service, etc.) however in other embodiments, one or more of the features may be identified after the passenger has entered the vehicle.

When the passenger requests a ride from the rideshare service, the features selected by the passenger may be identified from the rideshare vehicle, for example through the user profile of the passenger. For example, the features may be pushed to the vehicle by the service which stores the user profile, or the user's mobile device may push the features to the vehicle when the user enters the vehicle. The vehicle may then monitor the interior using one or more audio or video sensors. The sensors may include, for example, one or more microphones, a camera suited to recording visible-light spectrum images, a camera suited to recording infrared-spectrum images, or some other type of sensor.

Depending on the features enabled, the type of vehicle, etc., the vehicle may actively monitor the cabin of the vehicle constantly, for example through the audio or video sensors, or the vehicle may stay in a sleep-mode and only become active upon detection of the user-defined verbal cue. The active monitoring may be accomplished, for example, by way of a classifier for audio tone or volume, visual detection of various gestures (e.g., fast gestures or gestures with a wide range which may indicate heightened emotions or hostility), or visual detection of lack of movement (e.g., if a passenger becomes still which may indicate that they may need medical attention). Generally, audio elements may be described herein as "audio triggers" and visual elements may be described herein as "visual triggers."

Upon identification of a situation, the vehicle may perform one or more actions. The actions may be, for example, one of the pre-identified actions that were selected by the passenger as described above. In other embodiments, the actions may be an action that has been pre-identified by the vehicle as a "default" action. The actions may include responses such as contacting a pre-identified contact of the passenger, contacting an emergency service, etc. In some embodiments, the vehicle may provide information regarding the vehicle's current location, route, destination, etc. to the pre-identified contact or the emergency service. In some embodiments, the vehicle may provide audio or video recordings of the cabin to the pre-identified contact or the emergency service. In some embodiments, the vehicle may enable two-way communication between the cabin and the pre-identified contact or the emergency service. In some embodiments, the vehicle may change one or more settings of the cabin such as playing certain music (e.g., soothing music to de-escalate tension or anxiety of a passenger), changing a climate setting of the cabin (e.g., enabling heat or air conditioning if it appears that the passenger is uncomfortable), rolling down windows, etc.

In some embodiments, the vehicle may automatically re-route. For example, the vehicle may have originally been going to a first destination when the situation occurs. The vehicle may automatically re-route to a second destination upon detection of the situation. The second destination may be, for example, the location of the pre-identified contact, a police station, a hospital, the passenger's home or other identified location, etc. In some embodiments, the re-routing may relate to changing the vehicles route to go to streets or a location that is better lit, busier, etc.

In some embodiments, a first response may be to contact the pre-identified contact of the passenger, or an emergency service or other responder, to perform some degree of real-time analysis of the situation in the cabin. For example, two-way communication between the cabin and the pre-identified contact (or other responder) may be enabled such that the pre-identified contact or other responder may communicate with the passenger to determine whether there is a situation occurring where action by the vehicle is desirable, or whether the identification of the situation was premature (for example, if a situation identification based on a raised voice was false because the passenger was particularly animated while telling a story, or moving their body more than usual). Additionally or alternatively, the pre-identified contact or other responder may be provided with live audio or video of the vehicle cabin. If the pre-identified contact or other responder confirms that an action is desirable in response to the situation, then the vehicle may perform another action such as one of the actions described above. In some embodiments, the action may be a default action, or selected from the user profile of the passenger.

In some embodiments, some form of severity triage may be performed on the situation and used to identify the action that is to be taken in response to the situation. For example, raised voices at a first level may result in an action such as contacting a pre-identified contact. Raised voices at a higher level may result in an action such as re-routing or contacting an emergency service.

Additionally, in some embodiments certain actions such as re-routing of the vehicle, provision of audio or visual data to a pre-identified contact or an emergency service, etc. may occur without an overt or explicit notification given inside the cabin of the vehicle. For example, the vehicle may automatically re-route without any sort of verbal confirmation that it is doing so, or some other notification. This feature may be desirable if, for example, the passenger is encountering a hostile co-passenger, and an overt notification may exacerbate the hostile situation.

It will be understood that the above is intended as a generalized discussion of concepts related to various embodiments of the disclosure herein. Similarly, FIGS. 1-7 describe various examples of techniques related to embodiments of the present disclosure. However, it will be understood that FIGS. 1-7 are intended as highly simplified example techniques, and other embodiments may vary from those depicted. For example, certain of the Figures may include elements that are depicted as occurring sequentially. However, in other embodiments 1 or more of the elements of the Figures may occur concurrently with one another, or in a different order than depicted. Additionally, various of the Figures may include more or fewer elements than are depicted. Other variations may be present in other embodiments.

It will also be noted that FIGS. 3-7 are described with respect to actions performed by a vehicle such as vehicle 102. It will be understood that it is envisioned in this description that the action taken by the vehicle will be performed or facilitated by logic of the vehicle 102. The logic may include, for example, one or more processors, processor cores, circuits, or some other type of logic that is either onboard the vehicle 102 or stored remotely from the vehicle 102 (e.g., in the service 103) but communicatively coupled with the vehicle 102 and enabled to affect changes to the vehicle 102 as described below.

FIG. 1 depicts an example system overview between a passenger 101, a vehicle 102, and a rideshare service 103, in accordance with various embodiments. For the purposes of this example, it will be assumed that the service 103 is a service that is on a centralized platform such as one or more servers. The service 103 may be in communication with the passenger 101 by way of, for example, a mobile device of the passenger 101 such as a cellular phone. The service 103 may also be in communication with the vehicle 102 by way of, for example, a cellular link to one or more electronic or computing devices that are onboard the vehicle 102. However, it will be recognized that this is only one embodiment of the present disclosure, and other embodiments may have different system architectures such as a distributed architecture wherein elements of the service 103 are located on the vehicles 102, or some other architecture.

Initially, a passenger 101 may request a ride from the service 103 at 105. Specifically, the passenger 101 may input the request to an application on their mobile device, and the application may provide some form of input to the service 103 such as an identifier of the passenger 101, the passenger's location, etc.

The service 103 may then, optionally, provide various options at 110. For example, different vehicles in the rideshare service may have different sensors, or be equipped for different degrees of types of monitoring or actions that may be taken. These various options may be provided at 110 by the service 103 to the passenger 101. In response, the passenger 101 may input one or more user preferences related to the types of monitoring that are desired, or the actions that are to be taken in response to various situations, to the service 103 at 115. It will be understood, however, that in other embodiments the passenger 101 may have pre-identified these various options or choices, and stored those preferences in their user profile. Therefore, in other embodiments, the service 103 may identify the user preferences in the user profile rather than requesting the options from the passenger 101 at 110.

The service 103 may then provide information to the vehicle 102 at 120. The information provided may be or include information related to the user preferences with respect to monitoring, situation identification, actions to be taken, etc. The service 103 may also provide additional information to the vehicle 102 at 120 such as location information of the passenger 101, identification information of the passenger 101, etc. The vehicle may then pick up the passenger at 125.

Figure 2:
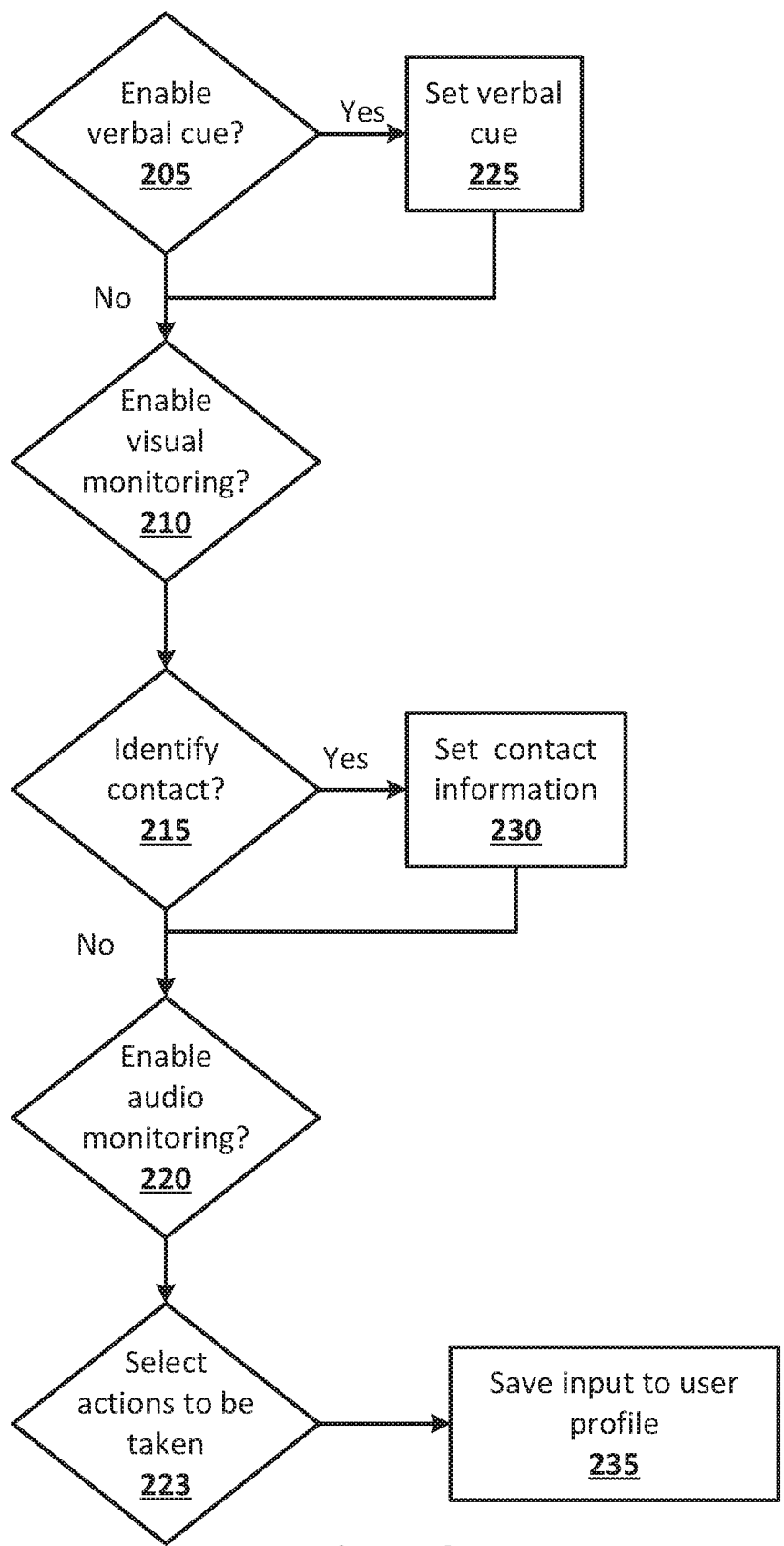
FIG. 2 depicts an example technique by which a passenger's preferences may be identified and stored in a user profile, in accordance with various embodiments.

As noted, the passenger may be able to input their preferences to the rideshare service. For example, the passenger 101 may be able to input their preferences at 115 into their profile, or at some other point (for example, when they first sign up for the rideshare service). FIG. 2 depicts an example technique by which a passenger's preferences may be identified and stored in a user profile, in accordance with various embodiments. It will be understood that although FIG. 2 is depicted as showing various elements in a sequential order, in other embodiments the various options may be depicted to the passenger concurrently with one another, or in a different order than depicted. Additionally, not all of the depicted elements may be present in some embodiments, or additional elements may be present that are not depicted in FIG. 2. In some embodiments, different ones of the options may be presented to the passenger at different times. For example, the option to identify the contact at 215 may be presented to the passenger while the passenger is setting up their user profile with the rideshare service, while the option to enable visual monitoring at 210 may be presented to the passenger while the passenger is requesting a vehicle from the rideshare service. Other variations may be present in other embodiments.

The passenger may be given the option to enable a verbal cue at 205. The verbal cue may be, for example, a specific word or phrase which may signal that the passenger wishes for the vehicle to take an action such as the actions above. If the passenger wishes to enable the verbal cue at 205, then the verbal cue may be set at 225. For example, the rideshare application on the passenger's mobile device may ask for the passenger to say the verbal cue one or more times so that the rideshare application can "learn" the verbal cue.

The passenger may also be given the option to enable visual monitoring at 210. Specifically, the vehicle (e.g., vehicle 102) may be equipped with one or more video sensors as described above. The passenger may be given the option to select whether the vehicle monitors the cabin for movement as described above.

The passenger may also be given the option to identify a contact at 215 (e.g., to the set the pre-identified contact as noted above). If the passenger selects that option at 215, then the passenger may set the contact information at 230. The contact information may include, for example, a name of the contact, one or more telephone numbers of the contact, a contact preference such as phone call or text message, an email address, a physical address, etc.

The passenger may also be given the option to enable audio monitoring at 220. In some embodiments, elements 205 and 220 may be presented simultaneously, or be considered to be identical to one another. In other embodiments, elements 205 and 220 may be separate from one another. Specifically, element 220 may relate to audio monitoring for tone or volume as described above.

The passenger may also be presented with one or more actions that are available to be taken at 223. The actions may be, for example, contacting the pre-identified contact from 215/230, re-routing the vehicle, altering a setting of the cabin, contacting an emergency service, or some other actions as described above.

The various user preferences may then be saved to a user profile at 235. The user profile may be present on, for example, the mobile device of the passenger, or they may be uploaded to the service 103 and stored by the service 103. These selections and preferences may be, or may be part of, the data provided to the vehicle 102 at 120 as described above.

Figure 3:
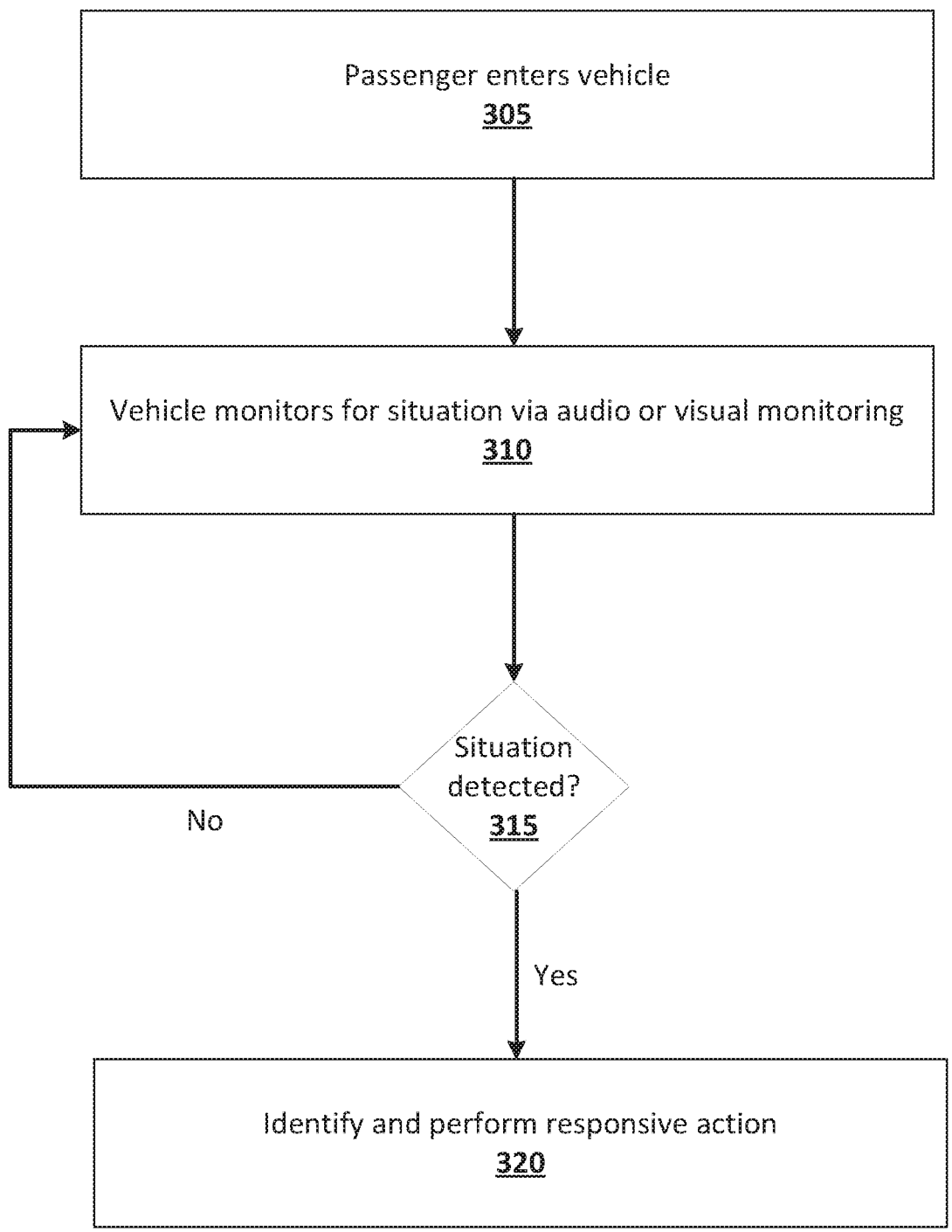
FIG. 3 depicts an example technique by which a vehicle may identify a situation related to a status of a passenger and adjust a vehicular setting in response, in accordance with various embodiments.

FIG. 3 depicts an example technique by which a vehicle (e.g., vehicle 102) may identify a situation related to a status of a passenger (e.g., passenger 101) and adjust a vehicular setting in response, in accordance with various embodiments. Generally, the example of FIG. 3 may relate to an example wherein a situation may arise related to a single passenger. For example, the passenger may be the only occupant of the vehicle. Alternatively, there may be multiple passengers in the vehicle, but none of the other passengers are contributing to an identified situation. Such an example may be if the passenger is having a medical issue such as overheating or anxiety, or some other type of situation.

Initially, the passenger may enter the vehicle at 305. Element 305 may generally correspond, for example, to element 125 of FIG. 1. The vehicle may then monitor for occurrence of a situation related to the passenger through audio or visual monitoring at 310. Such a monitoring may be based on, for example, the user preferences identified in FIG. 2. For example, the vehicle may monitor at 310 for a verbal cue, may perform audio monitoring for tone or volume of voice, visual monitoring for user movement, etc. The monitoring may be performed by one or more audio or video sensors of the vehicle as previously described above.

As described above, in some embodiments the monitoring at 310 may be active. For example, if audio or visual monitoring has been selected, the vehicle may actively monitor the cabin of the vehicle and constantly (e.g., on a continuous basis, on a periodic basis, on a semi-periodic basis related to an internal clock, etc.) evaluate whether a situation has been detected at 315. As an alternative example, the monitoring at 310 may be more passive. Specifically, the monitoring may only monitor for the presence of a verbal cue as described with respect to elements 205 and 225. Unless the verbal cue is identified at 315, the vehicle may not constantly monitor for the presence of a situation.

Once the situation is detected at 315, the vehicle may identify and perform a responsive action at 320. For example, the vehicle may identify a responsive action to be performed based on a user profile of the passenger as described above. Additionally or alternatively, the vehicle may identify a default action that is to be taken in case of the emergence of a situation, or detection of a specific type of situation. For example, a passenger that uses a verbal cue may indicate the use of a response that is different than a response which would be performed in the case of a passenger that stops moving. The actions may be, for example, adjustment of a setting of the vehicle such as a climate-related setting, an audio-related setting, lowering the windows, etc. Additionally or alternatively, the action may be contacting the pre-identified contact of the passenger, re-routing the vehicle, contacting an emergency service, or some other action as described herein.

Figure 4:
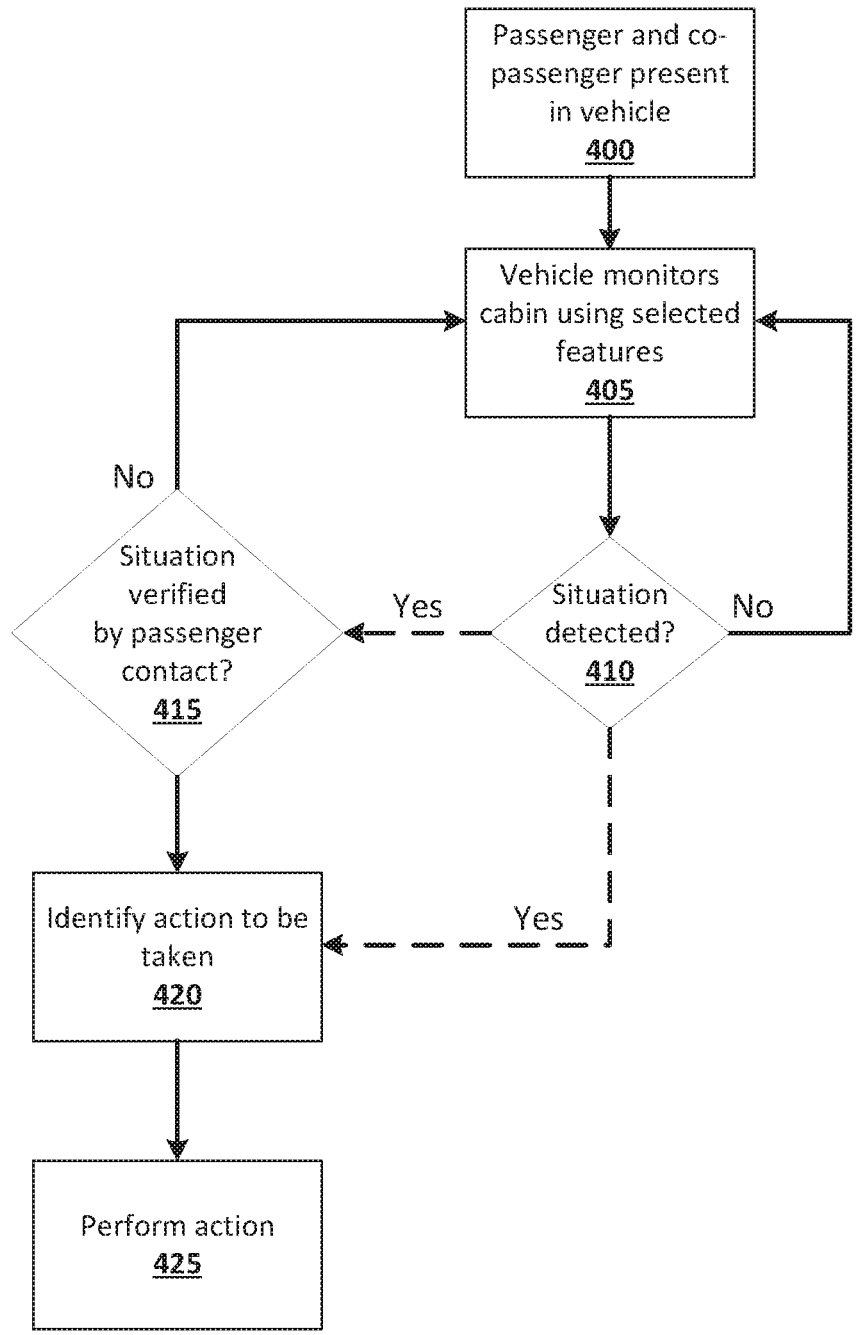
FIG. 4 depicts an example technique by which a vehicle may identify a situation related to a passenger and a co-passenger and perform an action in response, in accordance with various embodiments.

FIG. 4 depicts an example technique by which a vehicle (e.g., vehicle 102) may identify a situation related to a passenger (e.g., passenger 101) and a co-passenger and perform an action in response, in accordance with various embodiments. Such a situation may relate to an event wherein the passenger feels threatened or otherwise concerned by words or actions of the co-passenger. In this embodiment, it may be desirable for the vehicle to be enabled to identify the situation and perform a responsive action without explicitly alerting the co-passenger. As described above, such an alert could undesirably escalate the situation.

The technique may include identifying that the passenger and the co-passenger are present in the vehicle at 400. The passenger and co-passenger may have entered the vehicle at generally the same time (e.g., they may be picked up from the same location at the same time), or one of the passenger or co-passenger may already be present in the vehicle when the other is picked up. In some embodiments the passenger and co-passenger may be acquainted with one another, while in other embodiments they may not be acquainted with one another.

The technique may further include monitoring, at 405, the cabin using the features that were identified or selected by the passenger as described in, for example, FIG. 2. Similarly to element 310, the monitoring may be active or passive, and may be based on the specific monitoring features that were selected by the passenger (e.g., whether the passenger selected to use a verbal cue, audio monitoring, video monitoring, etc.). The monitoring may be used to identify whether a situation was detected at 410.

If the situation is detected at 410, the technique may perform one or more of the following two options. The options may be selected based on a preference of the passenger, a default setting of the vehicle, or according to some other criteria. The vehicle may contact a pre-identified contact of the passenger to verify the situation as described above at 415. If the contact indicates that the situation is not a situation wherein action is desired of the vehicle, then the technique may return to element 405.

However, if the contact verifies the situation at 415 (or, optionally, if the contact is not contacted at all as indicated in FIG. 4), then the vehicle may identify an action to be taken at 420. The action may be one or more of the actions described above such as re-routing the vehicle, contacting an emergency service, etc. As noted, in some embodiments the action at 420 may be identified based on a severity rating as previously described. The vehicle may then perform the selected action(s) at 425.

Figure 5:
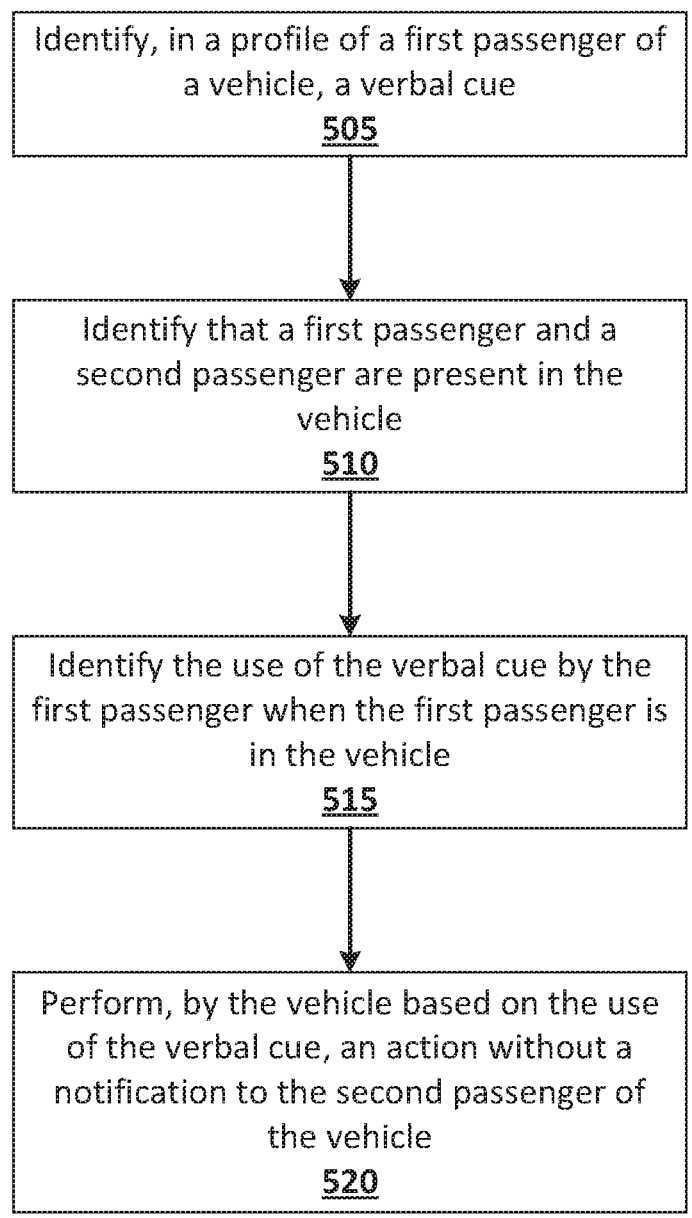
FIG. 5 depicts an example technique of cabin monitoring related to a verbal cue of a passenger, in accordance with various embodiments.

FIG. 5 depicts an example technique of cabin monitoring related to a verbal cue of a passenger, in accordance with various embodiments. Generally, FIGS. 5-7 may be described with respect to a situation that occurs when both a passenger and a co-passenger are present in the cabin of a vehicle. However, it will be understood that the techniques may likewise be applicable with minor modifications to situations that occur when a co-passenger is not present in the vehicle.

The technique may include identifying, by the vehicle at 505, in a profile of a first passenger of a vehicle, a verbal cue. The verbal cue may be, for example, the verbal cue that is set at 225, saved to the user profile at 235, and provided to vehicle 102 at 120. The technique may further include identifying, by the vehicle at 510, that a first passenger and a second passenger (e.g., the passenger and the co-passenger) are present in the vehicle. This identification may be performed by the vehicle based on, for example, one or more audio sensors, video sensors, identification of user profile information, etc.

The technique may further include identifying, by the vehicle at 515, the use of the verbal cue by the first passenger when the first passenger is in the vehicle. For example, the vehicle may identify, based on one or more audio sensors in the cabin of the vehicle, that the passenger has said the pre-identified word or phrase that was set at 225. The vehicle may then perform, at 520, based on the use of the verbal cue, an action without a notification to the second passenger of the vehicle. The action may be one or more of the actions described above such as re-routing, contacting a pre-identified contact or emergency service, etc. As previously described, the action may be taken without provided an explicit alert or notification to the cabin, and more specifically without providing an explicit alert or notification to the co-passenger.

Figure 6:
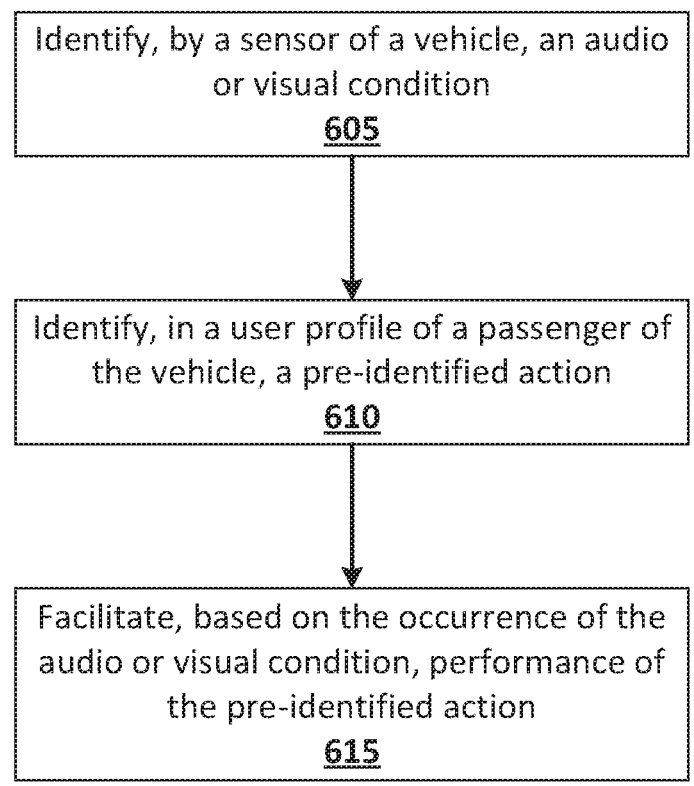
FIG. 6 depicts an example technique of cabin monitoring related to occurrence of an audio or visual condition, in accordance with various embodiments.

FIG. 6 depicts an example technique of cabin monitoring related to occurrence of an audio or visual condition, in accordance with various embodiments. The technique may include identifying, by a sensor of a vehicle at 605, an audio or visual condition. The condition may be one or more of the conditions described above which may indicate the occurrence of a situation in the cabin of the vehicle. For example, the condition may be or relate to a tone of voice, a volume of voice, a verbal cue, excess movement by a passenger or co-passenger, a reduction or lack of movement by a passenger or co-passenger, etc.

The technique may further include identifying, by the vehicle at 610, in a user profile of a passenger of the vehicle, a pre-identified action. The pre-identified action may relate to one or more of the actions that were selected or chosen by the passenger at, for example, 223. The technique may further include facilitating, by the vehicle at 615, based on the occurrence of the audio or visual condition, performance of the pre-identified action. Specifically, the vehicle (or one or more processors or other logical elements thereof) may facilitate contacting the emergency service, re-routing the vehicle, contact the pre-identified contact, etc. More specifically, the processor or other logical element that is executing the technique of FIG. 6 may not be the same processor that is managing the navigational routing of the vehicle. Therefore, the processor that is executing FIG. 6 may provide instructions to the navigational processor to re-route the vehicle. Similarly, the processor executing the technique of FIG. 6 may instruct a processor in a communication module of the vehicle to contact the pre-identified contact or emergency services etc. Additionally or alternatively, the processor executing the technique of FIG. 6 may perform the action. Each of these alternatives, or other similar alternatives, may fall under the facilitation of performance of the pre-identified action at 615.

Figure 7:
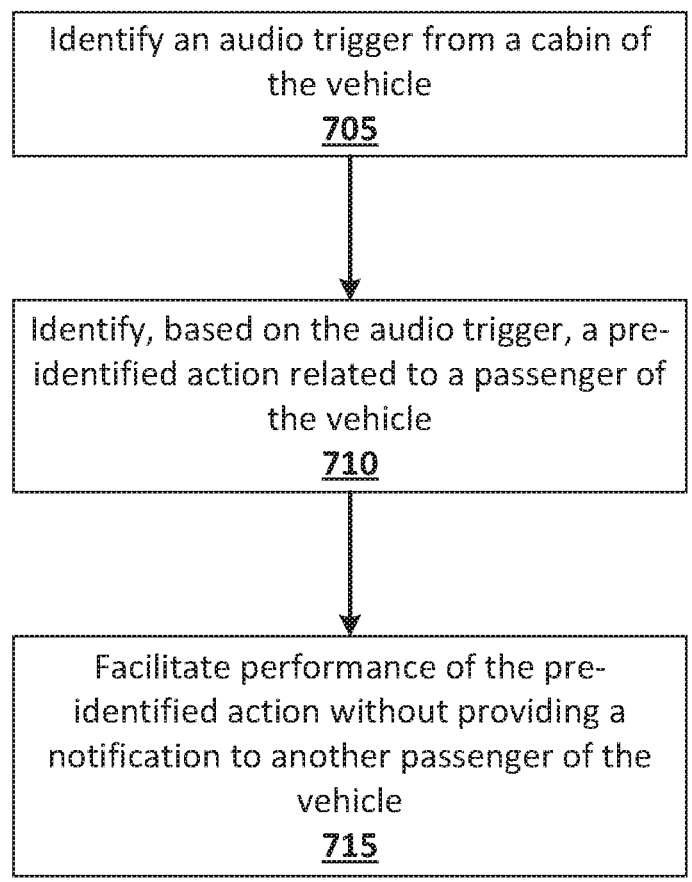
FIG. 7 depicts an example technique of cabin monitoring related to an audio trigger, in accordance with various embodiments.

FIG. 7 depicts an example technique of cabin monitoring related to an audio trigger, in accordance with various embodiments. The technique may include identifying, at 705, an audio trigger from the cabin of the vehicle. The vehicle may be similar to vehicle 102. The audio trigger may be, for example, a verbal cue, a tone of voice, a volume from within the cabin, etc.

Based on the audio trigger, the technique may further include identifying, by the vehicle at 710, a pre-identified action related to a passenger of the vehicle. The pre-identified action may be one or more of the actions described above, for example as described with respect to element 223 of FIG. 2. Additionally or alternatively, the pre-identified action may be or include a default action of the vehicle as described above.

The technique may further include facilitating, by the vehicle at 715, performance of the pre-identified action without providing a notification to another passenger of the vehicle. Element 715 may be similar to element 615, and the facilitation of the action at 715 may be similar to that described above with respect to element 615.

Figure 8:
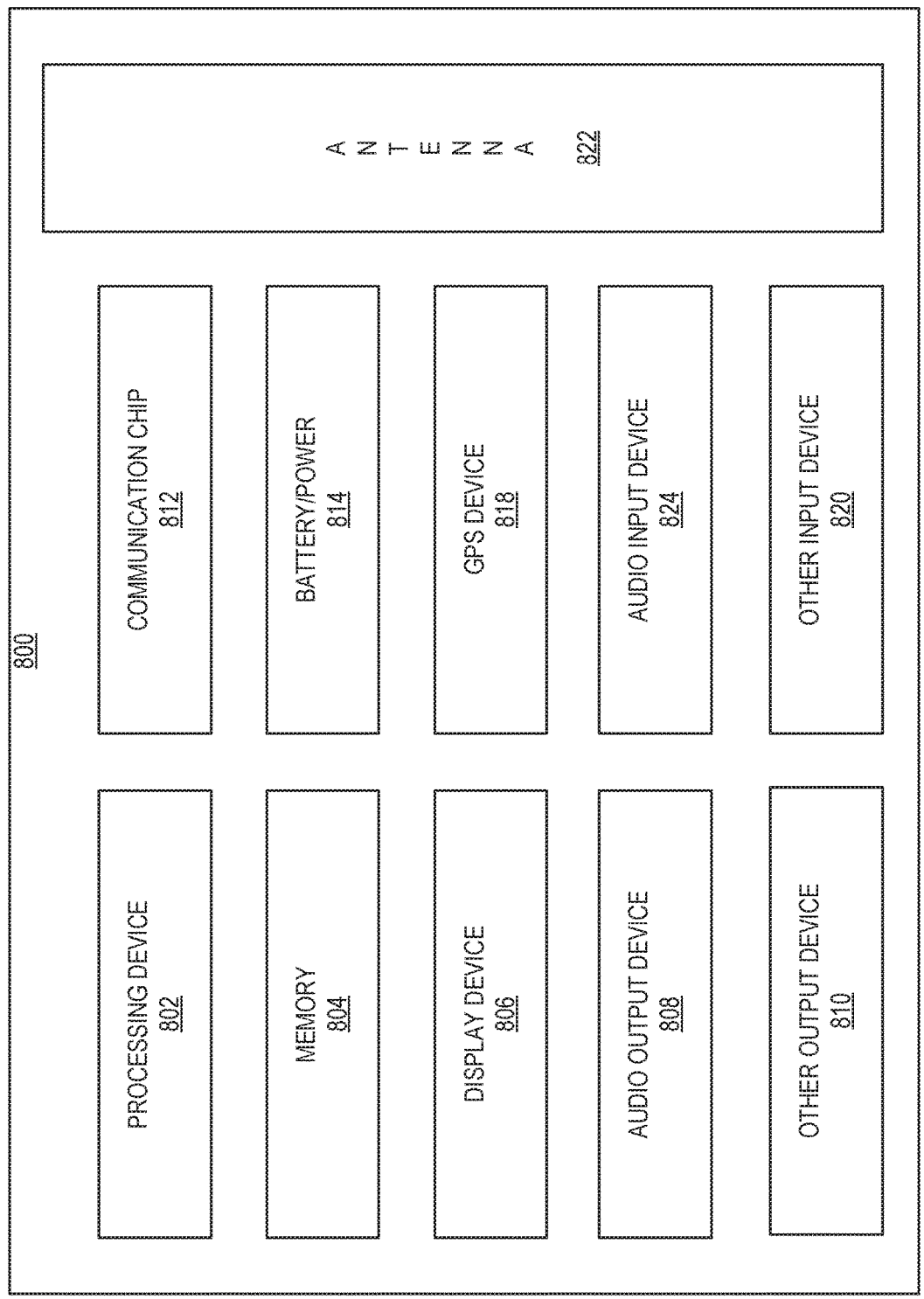
FIG. 8 is a block diagram of an example electrical device that may be present in a vehicle that is configured to perform audio or visual monitoring, in accordance with various embodiments.

FIG. 8 is a block diagram of an example electrical device that may be present in a vehicle that is configured to perform audio or visual monitoring, in accordance with various embodiments. A number of components are illustrated in FIG. 8 as included in the electrical device 800, but any one or more of these components may be omitted or duplicated, as suitable for the application. In some embodiments, some or all of the components included in the electrical device 800 may be attached to one or more motherboards. In some embodiments, some or all of these components are fabricated onto a single system-on-a-chip (SoC) die.

Additionally, in various embodiments, the electrical device 800 may not include one or more of the components illustrated in FIG. 8, but the electrical device 800 may include interface circuitry for coupling to the one or more components. For example, the electrical device 800 may not include a display device 806, but may include display device interface circuitry (e.g., a connector and driver circuitry) to which a display device 806 may be coupled. In another set of examples, the electrical device 800 may not include an audio input device 824 or an audio output device 808, but may include audio input or output device interface circuitry (e.g., connectors and supporting circuitry) to which an audio input device 824 or audio output device 808 may be coupled.

The electrical device 800 may include a processing device 802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 800 may include a memory 804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 804 may include memory that shares a die with the processing device 802. This memory may be used as cache memory and may include embedded dynamic random-access memory (eDRAM) or spin transfer torque magnetic random-access memory (STT-MRAM).

Generally, the processing device 802 may be configured to perform one or more aspects of various techniques or embodiments of the present disclosure. For example, the processing device 802 may be configured to perform navigational functions of the vehicle, communication functions of the vehicle, functions related to monitoring one or more sensors of the cabin, functions related to identification or performance of user preferences, or some other function or technique described herein or related to embodiments herein.

In some embodiments, the electrical device 800 may include a communication chip 812 (e.g., one or more communication chips). For example, the communication chip 812 may be configured for managing wireless communications for the transfer of data to and from the electrical device 800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 812 may operate in accordance with other wireless protocols in other embodiments. The electrical device 800 may include an antenna 822 to facilitate wireless communications and/or to receive other wireless communications (such as AM or FM radio transmissions).

In some embodiments, the communication chip 812 may manage wired communications, such as electrical, optical, or any other suitable communication protocols (e.g., the Ethernet). As noted above, the communication chip 812 may include multiple communication chips. For instance, a first communication chip 812 may be dedicated to shorter-range wireless communications such as Wi-Fi or Bluetooth, and a second communication chip 812 may be dedicated to longer-range wireless communications such as global positioning system (GPS), EDGE, GPRS, CDMA, WiMAX, LTE, EV-DO, or others. In some embodiments, a first communication chip 812 may be dedicated to wireless communications, and a second communication chip 812 may be dedicated to wired communications.

The electrical device 800 may include battery/power circuitry 814. The battery/power circuitry 814 may include one or more energy storage devices (e.g., batteries or capacitors) and/or circuitry for coupling components of the electrical device 800 to an energy source separate from the electrical device 800 (e.g., AC line power).

The electrical device 800 may include a display device 806 (or corresponding interface circuitry, as discussed above). The display device 806 may include any visual indicators, such as a heads-up display, a computer monitor, a projector, a touchscreen display, a liquid crystal display (LCD), a light-emitting diode display, or a flat panel display.

The electrical device 800 may include an audio output device 808 (or corresponding interface circuitry, as discussed above). The audio output device 808 may include any device that generates an audible indicator, such as speakers, headsets, or earbuds.

The electrical device 800 may include an audio input device 824 (or corresponding interface circuitry, as discussed above). The audio input device 824 may include any device that generates a signal representative of a sound, such as microphones, microphone arrays, or digital instruments (e.g., instruments having a musical instrument digital interface (MIDI) output).

The electrical device 800 may include a GPS device 818 (or corresponding interface circuitry, as discussed above). The GPS device 818 may be in communication with a satellite-based system and may receive a location of the electrical device 800, as known in the art.

The electrical device 800 may include another output device 810 (or corresponding interface circuitry, as discussed above). Examples of the other output device 810 may include an audio codec, a video codec, a printer, a wired or wireless transmitter for providing information to other devices, or an additional storage device.

The electrical device 800 may include another input device 820 (or corresponding interface circuitry, as discussed above). Examples of the other input device 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 800 may be any other electronic device that processes data.

EXAMPLES OF VARIOUS EMBODIMENTS

Example 1 includes one or more non-transitory computer-readable media comprising instructions that, upon execution of the instructions by one or more processors of an electronic device, are to cause the electronic device to: identify, in a profile of a first passenger of a vehicle, a verbal cue; identify that a first passenger and a second passenger are present in the vehicle; identify the use of the verbal cue by the first passenger when the first passenger is in the vehicle; and perform, by the vehicle based on the use of the verbal cue, an action without a notification to the second passenger of the vehicle.

Example 2 includes the one or more non-transitory computer-readable media of example 1, wherein the verbal cue is input to the profile of the first passenger before the first passenger enters the vehicle.

Example 3 includes the one or more non-transitory computer-readable media of examples 1 or 2, or some other example herein, wherein the action is related to re-routing the vehicle from a first destination to a second destination.

Example 3.5 include the one or more non-transitory computer-readable media of claim 3, or some other example herein, wherein the second destination is a street or a location that is better lit, busier, etc.

Example 4 includes the one or more non-transitory computer-readable media of examples 1 or 2, or some other example herein, wherein the action is related to contacting, by the vehicle, an emergency service.

Example 5 includes the one or more non-transitory computer-readable media of example 4, wherein the action is related to enabling, by the vehicle, two-way communication between the first passenger and the emergency service.

Example 6 includes the one or more non-transitory computer-readable media of example 4, wherein the action is related to providing real-time audio or visual data of a cabin of the vehicle to the emergency service.

Example 7 includes the one or more non-transitory computer-readable media of examples 1 or 2, or some other example herein, wherein the action is related to contacting, by the vehicle, a pre-identified contact of the first passenger.

Example 8 includes the one or more non-transitory computer-readable media of examples 1 or 2, or some other example herein, wherein the action is related to adjusting, by the vehicle, a setting of the vehicle related to a cabin in which the first passenger and the second passenger are present.

Example 9 includes a vehicle comprising: a sensor to identify, based on an audio or visual condition, occurrence of a situation related to a first passenger of the vehicle that includes the first passenger and a second passenger; and a processor coupled with the sensor, wherein the processor is to: identify, in a user profile of the first passenger of the vehicle, a pre-identified action; and facilitate, based on the occurrence of the audio or visual condition, performance of the pre-identified action by the vehicle.

Example 10 includes the vehicle of example 9, wherein the vehicle is an AV.

Example 11 includes the vehicle of example 10, wherein the user profile is related to a rideshare system of which the vehicle is a part.

Example 12 includes the vehicle of any of examples 9-11, or some other example herein, wherein the pre-identified action relates to re-routing of the vehicle.

Example 13 includes the vehicle of any of examples 9-11, or some other example herein, wherein the pre-identified action relates to contacting an emergency service.

Example 14 includes the vehicle of any of examples 9-11, or some other example herein, wherein the pre-identified action relates to contacting a pre-identified contact of the first passenger, and wherein the processor is further to: identify, in the user profile, a second pre-identified action; and facilitate, based on input provided by the pre-identified contact, performance of the second pre-identified action.

Example 14.5 includes the vehicle of any of examples 9-11, or some other example herein, wherein the pre-identified action is to be performed by the vehicle without a notification to the second passenger.

Example 15 includes an AV comprising: a first logic to maneuver the vehicle; a sensor to identify an audio trigger from a cabin of the vehicle that includes a first passenger and a second passenger; and one or more processors coupled with the sensor, wherein the one or more processors are to: identify, based on the audio trigger, a pre-identified action related to the first passenger; and facilitate performance of the pre-identified action without providing a notification to the second passenger.

Example 16 includes the AV of example 15, wherein the audio trigger is related to a vocal tone or a vocal volume of the first or second passengers.

Example 17 includes the AV of example 15, wherein the audio trigger is related to a pre-identified verbal cue, wherein the pre-identified verbal cue is identified by the first passenger before the first passenger enters the cabin of the vehicle.

Example 18 includes the AV of example 15, further comprising a video sensor to identify a video trigger from the cabin of the vehicle, wherein the processor is further to identify, based on the video trigger, the pre-identified action.

Example 19 includes the AV of any of examples 15-18, or some other example herein, wherein the pre-identified action relates to facilitating, by the first logic, instructions to: cancel maneuvering the vehicle to a first location; and maneuver the vehicle to a second location.

Example 20 includes the AV of example 19, wherein the second location is a location of an emergency service.

Example 21 includes an apparatus comprising circuitry to perform one or more functions, techniques, processes, or methods related to any of examples 1-20, some combination thereof, or any other example or embodiment of the present disclosure.

Example 22 includes one or more non-transitory computer-readable media comprising instructions that, upon execution of the instructions by one or more processors of an electronic device, are to cause the electronic device to perform one or more functions, techniques, processes, or methods related to any of examples 1-20, some combination thereof, or any other example or embodiment of the present disclosure.

Example 23 includes a method that includes or is related to one or more functions, techniques, processes, or methods related to any of examples 1-20, some combination thereof, or any other example or embodiment of the present disclosure.

Example 24 includes an apparatus comprising means to perform or facilitate the performance of one or more functions, techniques, processes, or methods related to any of examples 1-20, some combination thereof, or any other example or embodiment of the present disclosure.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. One or more non-transitory computer-readable media comprising instructions that, upon execution of the instructions by one or more processors of an electronic device, are to cause the electronic device to:
identify, in a profile of a first passenger of a vehicle, a first verbal cue involving raised voices at a first volume level, and a first default action corresponding to the first verbal cue to contact a pre-identified contact, provide information regarding the vehicle's current location, route, and destination to the pre-identified contact, and provide audio and video recordings of a cabin of the vehicle to the pre-identified contact, wherein the first verbal cue and the first default action are input to the profile of the first passenger before the first passenger enters the vehicle;
identify that a first passenger and a second passenger are present in the vehicle;
identify a use of the first verbal cue when the first passenger and the second passenger are present in the vehicle;
perform, by the vehicle based on the use of the first verbal cue, the first default action covertly and without a notification to the second passenger of the vehicle;
identify, in the profile of the first passenger of the vehicle, a second verbal cue involving raised voices at a second volume level that is higher than the first volume level, and a second default action corresponding to the second verbal cue to re-route the vehicle from a first destination to a second destination and change the vehicle's route to go to streets that is better lit and busier than the vehicle's original route;

identify a use of the second verbal cue when the first passenger and the second passenger are present in the vehicle; and perform, by the vehicle based on the use of the second verbal cue, the second default action covertly and without a notification to the second passenger of the vehicle.

2. The one or more non-transitory computer-readable media of claim 1, wherein the first passenger and the second passenger are participating in a rideshare service, and the vehicle is part of the rideshare service.

3. The one or more non-transitory computer-readable media of claim 1,
wherein the second destination is a street or a location that is better lit or busier than the first destination.

4. The one or more non-transitory computer-readable media of claim 1, wherein the pre-identified contact is an emergency service.

5. The one or more non-transitory computer-readable media of claim 4, wherein the first default action further includes enabling, by the vehicle, two-way communication between the first passenger and the emergency service.

6. The one or more non-transitory computer-readable media of claim 4, wherein the first default action further includes providing real-time audio or visual data of a cabin of the vehicle to the emergency service.

7. The one or more non-transitory computer-readable media of claim 1, wherein the instructions are to cause the electronic device to further:
identify, in the profile of the first passenger of the vehicle, a third verbal cue involving a specific word or phrase, and a third default action corresponding to the third verbal cue;
identify a use of the third verbal cue by the first passenger when the first passenger and the second passenger are present in the vehicle; and
perform, by the vehicle based on the use of the third verbal cue, the third default action without a notification to the second passenger of the vehicle.

8. The one or more non-transitory computer-readable media of claim 1, wherein the instructions are to cause the electronic device to further:
identify, in the profile of the first passenger of the vehicle, a visual cue involving a movement pattern in a cabin of the vehicle, and a further default action corresponding to the visual cue;
detect the visual cue when the first passenger and the second passenger are present in the vehicle; and
perform, by the vehicle based on the detected visual cue, the further default action corresponding to the visual cue without a notification to the second passenger of the vehicle.

9. A vehicle comprising:
a sensor to identify, based on one or more audio triggers, occurrence of a situation related to a first passenger of the vehicle that includes the first passenger and a second passenger; and
a processor coupled with the sensor, wherein the processor is to:
identify, in a user profile of the first passenger of the vehicle, a first audio trigger involving raised voices at a first volume level, and a first default action corresponding to the first audio trigger to contact a pre-identified contact, provide information regarding the vehicle's current location, route, and destination to the pre-identified contact, and provide audio and video recordings of a cabin of the vehicle to the pre-identified contact, wherein the first audio trigger and the first default action are input to the user profile of the first passenger before the first passenger enters the vehicle;
perform, based on the occurrence of the first audio trigger, the first default action by the vehicle without alerting the second passenger of the vehicle;
identify, in the user profile of the first passenger of the vehicle, a second audio trigger involving raised voices at a second volume level that is higher than the first volume level, and a second default action corresponding to the second audio trigger to re-route the vehicle from a first destination to a second destination and change the vehicle's route to go to streets that is better lit and busier than the vehicle's original route, wherein the second audio trigger and the second default action are input to the user profile of the first passenger before the first passenger enters the vehicle; and
perform, based on the occurrence of the second audio trigger, the second default action by the vehicle without alerting the second passenger of the vehicle.

10. The vehicle of claim 9, wherein the vehicle is an autonomous vehicle.

11. The vehicle of claim 9, wherein the user profile is related to a rideshare system of which the vehicle is a part.

12. The vehicle of claim 9,
wherein the second destination is a street or a location that is better lit or busier than the first destination.

13. The vehicle of claim 9, wherein the pre-identified contact is an emergency service.

14. The vehicle of claim 9, wherein processor is further to: provide real-time audio or visual data of the cabin of the vehicle to the pre-identified contact.

15. An autonomous vehicle comprising:
a first logic to maneuver the autonomous vehicle;
a sensor to identify a first audio trigger and a second audio trigger from a cabin of the autonomous vehicle that includes a first passenger and a second passenger, wherein the first audio trigger indicates raised voices at a first volume level, and the second audio trigger indicates raised voices at a second volume level that is higher than the first volume level; and
one or more processors coupled with the sensor, wherein the one or more processors are to:
identify a first pre-identified action corresponding to the first audio trigger in a user profile of the first passenger, wherein:
the first pre-identified action is to contact a pre-identified contact, provide information regarding the vehicle's current location, route, and destination to the pre-identified contact, and provide audio and video recordings of a cabin of the vehicle to the pre-identified contact; and
the first audio trigger and the first pre-identified action are input to the user profile of the first passenger before the first passenger enters the autonomous vehicle;
in response to the first audio trigger being identified, perform the first pre-identified action covertly and without providing a notification to the second passenger;

identify a second pre-identified action corresponding to the second audio trigger in the user profile of the first passenger, wherein:
- the second pre-identified action is to re-route the autonomous vehicle from a first destination to a second destination and change the vehicle's route to go to streets that is better lit and busier than the vehicle's original route; and
- the second audio trigger and the second pre-identified action are input to the user profile of the first passenger before the first passenger enters the autonomous vehicle; and in response to the second audio trigger being identified, facilitate the first logic to perform the second pre-identified action covertly and without providing a notification to the second passenger.

16. The autonomous vehicle of claim 15, wherein the second destination is a street or a location that is better lit or busier than the first destination.

17. The autonomous vehicle of claim 15, wherein the second destination is a location of the pre-identified contact.

18. The autonomous vehicle of claim 15, further comprising a video sensor to identify a video trigger from the cabin of the vehicle, wherein the one or more processors is further to:
- identify, based on the video trigger, a third pre-identified action corresponding to the video trigger in the user profile of the first passenger; and
- in response to the video trigger being identified, perform the third pre-identified action without providing a notification to the second passenger.

19. The autonomous vehicle of claim 15, wherein the pre-identified contact is a contact of an emergency service.

20. The autonomous vehicle of claim 15, wherein the second destination is a location of an emergency service.

* * * * *